United States Patent
Schindzielorz et al.

(10) Patent No.: US 10,480,107 B2
(45) Date of Patent: Nov. 19, 2019

(54) METHOD OF MAKING A FLAME RESISTANT AIRBAG SUITABLE FOR USE IN AVIATION APPLICATIONS

(71) Applicant: SCHROTH SAFETY PRODUCTS LLC, Pompano Beach, FL (US)

(72) Inventors: Michael H. Schindzielorz, Kernersville, NC (US); Akira Kokeguchi, Tokyo (JP)

(73) Assignee: Schroth Safety Products, LLC, Pompano Beach, FL (US)

( * ) Notice: Subject to any disclaimer, the term of this patent is extended or adjusted under 35 U.S.C. 154(b) by 0 days.

(21) Appl. No.: 15/658,371

(22) Filed: Jul. 24, 2017

(65) Prior Publication Data
US 2017/0321355 A1   Nov. 9, 2017

Related U.S. Application Data

(63) Continuation-in-part of application No. 14/516,869, filed on Oct. 17, 2014, now Pat. No. 9,745,693.
(Continued)

(51) Int. Cl.
*B60R 21/235* (2006.01)
*D03D 15/12* (2006.01)
(Continued)

(52) U.S. Cl.
CPC ........ *D03D 15/12* (2013.01); *B60R 21/235* (2013.01); *D03D 1/02* (2013.01); *D03D 1/04* (2013.01); *D03D 47/32* (2013.01); *D06M 15/564* (2013.01); *D06N 3/0006* (2013.01); *D06N 3/0036* (2013.01); *D06N 3/0059* (2013.01); *B60R 2021/23514* (2013.01); *B60R 2021/23542* (2013.01); *B60Y 2200/50* (2013.01); *B64D 11/06205* (2014.12); *B64D 2201/00* (2013.01); *D06M 2101/32* (2013.01); *D06M 2200/30* (2013.01); *D06N 2203/068* (2013.01); *D06N 2209/067* (2013.01); *D06N 2211/267* (2013.01); *D06N 2211/268* (2013.01); *D10B 2331/04* (2013.01); *D10B 2505/124* (2013.01);
(Continued)

(58) Field of Classification Search
None
See application file for complete search history.

(56) References Cited

U.S. PATENT DOCUMENTS

| | | | | |
|---|---|---|---|---|
| 5,540,965 A | * | 7/1996 | Nishimura | B60R 21/235 139/389 |
| 6,429,155 B1 | * | 8/2002 | Li | B32B 27/02 280/728.1 |
| 2014/0000751 A1 | * | 1/2014 | Kagumba | C08G 63/916 139/420 R |

* cited by examiner

Primary Examiner — Arti Singh-Pandey
(74) Attorney, Agent, or Firm — Trueba & Suarez, PLLC; Roberto M. Suarez; Darlene Barron

(57) ABSTRACT

A method of making a flame resistant airbag suitable for use in aviation applications is discussed. A flame resistant fabric for the use in the construction of aviation airbags is woven from a high tenacity continuous polyester fiber substrate. A polyurethane coating is applied to the woven fabric, which has been treated with a flame retardant, to impart high pressure permeability resistance to the flame resistant fabric. The resulting fabric complies with Federal Aviation Requirement 25.853 as well as exhibits sufficient high pressure permeability resistance which is measured as a pressure of not less than about 198 kPa after five seconds from an initial inflation and pressurization to about 200 kPa, such as may be encountered in and during an inflation of aviation airbag assemblies.

7 Claims, 1 Drawing Sheet

Current Automotive Airbag Fabric
Fails 25.853 Vertical Burn Test

Aviation Airbag Fabric
Passes 25.853 Vertical Burn Test

Related U.S. Application Data

(60) Provisional application No. 61/954,847, filed on Mar. 18, 2014.

(51) Int. Cl.
    *D03D 1/04*        (2006.01)
    *D03D 1/02*        (2006.01)
    *D03D 47/32*      (2006.01)
    *D06M 15/564*    (2006.01)
    *D06N 3/00*       (2006.01)
    D06M 101/32    (2006.01)
    B64D 11/06     (2006.01)

(52) U.S. Cl.
    CPC .... *Y10T 442/2656* (2015.04); *Y10T 442/2672* (2015.04); *Y10T 442/2721* (2015.04)

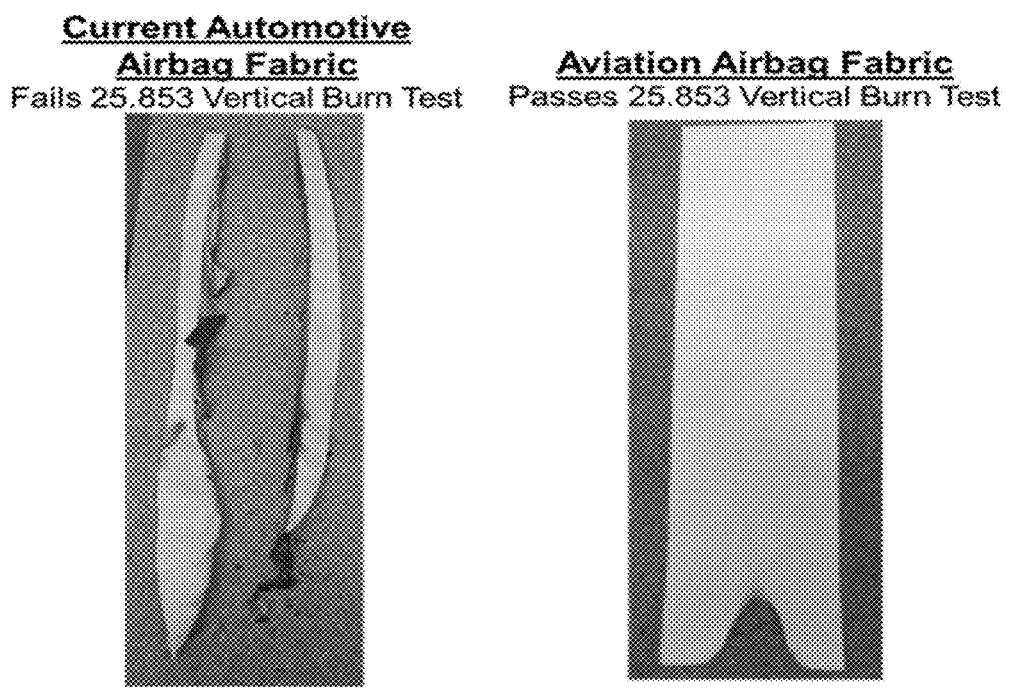

METHOD OF MAKING A FLAME RESISTANT AIRBAG SUITABLE FOR USE IN AVIATION APPLICATIONS

CROSS-REFERENCE TO RELATED APPLICATIONS

This U.S. Non-Provisional Patent Application is a continuation-in-part application of, and claims the benefit of, U.S. Utility patent application Ser. No. 14/516,869, filed on 17 Oct. 2014, issued as U.S. Pat. No. 9,745,693, which is a non-provisional of the U.S. Provisional Patent Application No. 61/954,847, filed on 18 Mar. 2014, which are all incorporated by reference as if fully set forth herein.

STATEMENT REGARDING FEDERALLY SPONSORED RESEARCH OR DEVELOPMENT

None.

FIELD OF THE INVENTION

The present invention is directed to a method of making a flame resistant airbag suitable for use in aviation applications. The method disclosed and described herein produces structures characterized to meet both the vertical flammability requirements in accordance with Federal Aviation Requirement 25.853, as well as having a high pressure permeability resistance measured as a pressure of not less than about 198 kPa after five seconds from an initial inflation and pressurization to a pressure of about 200 kPa.

BACKGROUND

Similar to the safety regulations and requirements for most motor vehicles travelling along the highways and byways of the United States, inflatable airbag systems are required in most aircraft which traverse U.S. airways. Also, similar to the National Highway Safety Administration which issues and administers Federal Motor Vehicle Safety Standards ("FMVSS") regarding the manufacture of motor vehicles and equipment therein, the Federal Aviation Administration ("FAA") establishes standards for the regulation of aircraft and equipment utilized therein, including Federal Aviation Requirements ("FAR"). Other airworthiness authorities operate around the world, and a great majority of them adhere to the safety standards set by the FAA.

Among these common requirements, are constraints of flammability of airbag materials, regulated for automobiles via FMVSS 302, and for aircraft via FAR 25.853. More in particular FMVSS 302 establishes a horizontal burn test requirement for fabrics used in the airbags installed in automobiles for use in the United States.

The FAA, however, has established a more stringent vertical burn requirement for fabrics utilized in the material of construction of inflatable airbags for use in aircraft by way of FAR 25.853. Currently, however, no fabric is known or utilized in the aircraft industry which meets the vertical burn requirement of FAR 25.853, and therefore, the FAA has been forced to provide a waiver of the vertical flammability requirement, instead acceding to the horizontal burn test requirements of the less stringent FMVSS 302 horizontal.

According to the FAA, "[w]hile inflatable airbags are now standard in the automotive industry, the use of inflatable-airbag systems in commercial aviation is novel and unusual." (Special Conditions: Cessna Airplane Company Model 680A Airplane, SideFacing Seats Equipped With Airbag Systems, 14 CFR Part 25 [Docket No. FAA-2015-2271; Special Conditions No. 25-602-SC] Oct. 6, 2015.) Furthermore, the FAA recognizes that the state-of-the art for airbag fabrics do not adequately meet the performance and flammability requirements required to keep passengers safe in aviation applications, stating, "the specialized function of the inflatable-airbag system means that highly specialized materials are required. The standard normally applied to fabrics is a 12-second vertical ignition test. However, materials that meet this standard do not perform adequately as inflatable restraints; and materials used in the construction of inflatable-airbag systems do not perform well in this test." (Id.)

Table 1, below, provides a comparison of the flammability requirements between FMVSS 302 horizontal, FAR 25.853 horizontal, and FAR 25.853 vertical.

TABLE 1

|  | FMVSS 302 Horizontal | FAA 25.853 Horizontal | FAA 25.853 Vertical |
|---|---|---|---|
| Distance from flame | 0.748 in | 0.75 in | 0.75 in |
| Flame exposure | 15 seconds | 15 seconds | 12 seconds |
| Burn requirement (stop) | 60 seconds | N/A | 15 seconds |
| Burn requirement (length) | 2.01 in | N/A | 8 in |
| Burn requirements (rate) | 4.02 in per min | 2.5 in per min | N/A* |
| Burn requirements (drippings) | N/A | N/A | 5 seconds |

*Must be self extinguishing

FIG. 1 shows samples of current automotive airbag fabric versus the aviation airbag fabric produced using the method taught by the present invention, when tested to the requirements of FAA 25.853 Vertical Burn Test.

In addition to the flame test requirements under FAR 25.853, materials of construction for inflatable airbags for installation in aircraft must also meet a high pressure permeability resistance. More in particular, fabrics for use in aviation airbags must exhibit a high pressure permeability resistance which is measured as a pressure of not less than about 198 kilopascals ("kPa") after five seconds from an initial inflation and pressurization to 200 kPa.

Previous attempts in the art directed to providing airbags for use in aviation applications merely present conventional airbags and request a flammability waiver from the FAA. Indeed, a search of the prior art airbags and methods of making airbags yields many that make reference to their use in vehicles "including aircraft," but provide no disclosure as to what features, if any, make them suitable for use in aircraft.

Indeed, merely utilizing "flame resistant" fabric is not sufficient to meet the stringent FAA vertical burn requirements of FAR 25.853. FIG. 1 shows the difference between flame resistant fabric as is used in current airbags, as well as the aviation airbag fabric disclosed herein, when tested to the vertical burn requirements of FAR 25.853.

Attempts in the art to impart improved fire resistance have been at the expense of air permeability performance. As stated by the FAA, and noted above, materials that meet the fire resistance standard do not perform adequately as inflatable restraints; and materials traditionally used in the construction of inflatable-airbag systems (such as in land vehicles) do not perform well in the FAA vertical burn test.

At the present time the Federal Aviation Administration ("FAA") of the United States of America has issued a number of Federal Aviation Requirements ("FAR") directed to various aspects of aircraft construction and operation. Among these requirements is Federal Aviation Administration FAR 25.853 which includes, among other things, vertical flammability requirements for materials used in many aircraft operated in the United States. More in particular, in accordance with FAR 25.853 a material for use in aircraft in the United States must meet vertical flammability requirements which include, a flame time which is not to exceed fifteen seconds, a burn length, which is not to exceed eight inches, and a drip flame which is not to exceed five seconds.

Once again, as stated above, at the present time there are no fabrics known which meet the stringent requirements of FAR 25.853 for vertical flammability which may utilized for construction of aviation airbags in aircraft operated in the United States. As such, the FAA has indefinitely waived this requirement provided that any fabric utilized for aviation airbags is sufficiently flame resistant to pass the less stringent requirements of a horizontal flame test in accordance with the Federal Motor Vehicle Safety Standard 302.

The table presented in FIG. 1 is illustrative of the results obtained for a nylon fabric which is coated with 30 grams per square meter ("gsm") of liquid silicone rubber, as is typical for use in airbag fabrics utilized in automobiles in the United States, when the fabric is subjected to vertical flammability testing in accordance with FAR 25.853. As is readily apparent from the results presented in FIG. 1, a nylon fabric coated with liquid silicone rubber fails to meet the requirements for vertical flammability resistance under 25.853. In accordance with at least one embodiment of the present invention, a flame resistant fabric for aviation airbags comprises the uncoated polyester fiber.

In view of the foregoing, it is understood and appreciated by those of skill in the art that it will be beneficial to provide a flame resistant fabric for use in the construction of various components for aircraft, including, but not limited to, aviation airbags. A further benefit may be realized by providing a flame resistant fabric which meets the vertical flammability requirements in accordance with FAR 25.853. Yet another benefit may be realized by providing such a flame resistant fabric which also comprises high pressure permeability resistant which is in compliance with FAA requirements.

It would be further appreciated from the foregoing that considerable benefits will be realized for the safety of passengers and crew in aircraft flying throughout the world to provide a flame resistant fabric for the construction of aviation airbags which meets the stringent vertical flammability requirements of FAR 25.853 as well as meeting the FAA's high pressure permeability resistance requirements, such as the present inventive flame resistant fabric discussed in greater detail hereinafter.

While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

In this specification, where a document, act, or item of knowledge is referred to or discussed, this reference or discussion is not an admission that the document, act, or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

In this specification and in the appended claims and drawings, words and phrases have the meanings commonly attributed to them in the relevant art except as otherwise specified herein.

The present invention may address one or more of the problems and deficiencies of the prior art discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

In view of the foregoing, an embodiment herein provides a novel method of making a flame resistant airbag, suitable for use in aviation applications, which is capable of passing FAR 25.853 vertical burn requirements and meeting air permeability performance requirements. Specifically, an embodiment of the method involves the processing of a high tenacity, continuous polyester filament yarn, to create a fabric that exhibits the desired high pressure permeability resistance and flammability requirements required for aviation applications, and then constructing an airbag utilizing that fabric.

It is one aspect of the present invention to provide a flame resistant fabric for use in the construction of the components for aircraft.

It is a further aspect of the present invention to provide a flame resistant fabric for use in aviation airbags installed in aircraft such that the fabric is in conformance with Federal Aviation requirement FAR 25.853 for vertical flammability.

Yet another aspect of the present invention is to provide flame resistant fabric, which is coated to provide high pressure permeability resistance in accordance with FAR requirements, for use in aviation airbags installed in aircraft.

In yet one further aspect, the present invention provides a method for making a flame resistant fabric, which is processed to provide a high pressure permeability resistance that is measured as a pressure of not less than about 198 kilopascals ("kPa") after five seconds from an initial inflation and pressurization to 200 kPa, for use in aviation airbags.

One further aspect of the present invention is to provide a flame resistant fabric for use in aviation airbags installed in aircraft which is coated to provide a high pressure permeability resistance which is measured as a pressure of not less than about 198 kPa after five seconds from an initial inflation and pressurization to about 200 kPa, wherein the coating comprises a flame retardant such that the fabric is in conformance with Federal Aviation requirement FAR 25.853 for vertical flammability.

These and other objects, features and advantages of the present invention will become clearer when the drawings as well as the detailed description are taken into consideration.

BRIEF DESCRIPTION OF THE DRAWINGS

These and other features, aspects, and advantages of the present invention will become better understood with regard to the following description, appended claims, and accompanying drawings where:

FIG. 1 shows samples of current automotive airbag fabrics and the fabric made by the claimed method, after being subjected to the FAR vertical burn test.

DESCRIPTION

In the Summary of the Invention above, in the Description and appended Claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

While the specification will conclude with claims defining the features of embodiments of the invention that are regarded as novel, it is believed that the invention will be better understood from a consideration of the following description in conjunction with the FIGURES, in which like reference numerals are carried forward.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

As stated above, the present invention is directed to methods of making flame resistant fabric for use in constructing airbags for installation and use an aircraft.

In a preferred embodiment, a method of making a flame resistant fabric suitable for use in the construction of airbags for aviation applications begins with providing a high tenacity continuous polyester filament yarn. The high tenacity continuous polyester filament yarn preferably has a polyester fiber substrate and a phosphate-phosphonate compound. Air bag fabrics require high tenacity continuous filament yarn to achieve the strength properties required for performance.

Other flame resistant fabrics in the art utilize fibers as opposed to continuous filaments. The addition of components such as this dramatically reduces the strength of the yarn due to the disruption and molecular alignment of the polymer chain by the introduction of the fibers. The use of the continuous filament yarn, as disclosed here, avoids the disruption of the continuity of the polymer chain and alignment of the polymer chains created by the impact on the chain length and crystallization impacted by the use of fiber additives as is currently known in the art.

The high tenacity continuous polyester filament yarn is woven into a plain weave pattern fabric and heat set.

The heat set fabric is then coated with a coating composition and tested against aviation-specific performance requirements.

In embodiments, the high tenacity continuous polyester filament yarn may also have a 500 to 600 denier-90 to 100 filament polyester film substrate and phosphorous levels in the range of 1000 to 7000 ppm. The yarn is also characterized as having a tenacity of at least 3 to 7 grams per denier.

In a preferred embodiment, the high tenacity continuous polyester filament yarn is optimally a 560 denier, 96 filament polyester yarn with a phosphorous level of 5200-6500 ppm and a tenacity of 6.5 grams per denier.

The yarn is woven into a plain weave on a water jet loom where the filling yarn and the warp yarn are the same said high tenacity continuous polyester filament yarn.

The woven fabric is dried via heat setting, where said heat setting occurs between 340 degrees Fahrenheit to 420 degrees Fahrenheit for a period of time of about 30 to 60 seconds. The heat setting is performed on a pin tenter that shrinks and sets said fabric to 45-53 ends and 45-53 picks.

The heat set fabric is now dimensionally stable but does not yet meet the air permeability requirements for an aviation airbag. A coating composition comprising polyurethane with flame retardant additives is then applied to achieve a coat weight of between 25-50 grams per square meter.

The resultant fabric can now be cut and sewn as required to form an airbag that meets both the flammability and air permeability performance requirements for an aviation airbag.

In yet another embodiment, a flame resistant fabric in accordance with the present invention having a polyester fiber which is treated with a phosphate-phosphonate compound and subsequently heat set and is then coated with a flame retardant polyurethane exhibits a high pressure permeability resistance which is measured as a pressure of not less than about 198 kPa after five seconds from an initial inflation and pressurization to about 200 kPa, such as may be encountered in and during an inflation of aviation airbag assemblies.

Since many modifications, variations and changes in detail can be made to the described embodiments of the invention, it is intended that all matters in the foregoing description and shown in the accompanying FIGURES be interpreted as illustrative and not in a limiting sense. Thus, the scope of the invention should be determined by the appended claims and their legal equivalents.

It will be appreciated that the methods, processes, devices, apparatus, and systems described above are set forth by way of example and not of limitation. Numerous variations, additions, omissions, and other modifications will be apparent to one of ordinary skill in the art.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims.

What is claimed is:

1. A method of making a flame resistant aviation airbag suitable for use in aviation applications, said method comprising the steps of:
    providing a high tenacity continuous polyester filament yarn, said high tenacity continuous polyester filament yarn having a polyester fiber substrate and a phosphate-phosphonate compound;
    weaving said high tenacity continuous polyester filament yarn into a plain weave pattern fabric;
    said fabric comprising a plurality of high tenacity continuous polyester filament yarn woven into a plain weave pattern characterized by a count of 49-53 per inch by 49-53 per inch;
    heat setting said fabric to between 340 degrees Fahrenheit to 420 degrees Fahrenheit for a period of time of about 30 to 60 seconds;
    providing a coating composition onto said fabric and said coating composition comprising a flame retardant and a polyurethane;
    applying said coating composition to the fabric to achieve a coat weight of between 25-50 grams per square meter;
    and constructing an aviation airbag utilizing said fabric, whereby said aviation airbag exhibits a high pressure permeability resistance characterized as a pressure of not less than 198 kPa after five seconds from an initial inflation and pressurization to 200 kPa, as well as, vertical flammability performance, and adequately conforms pursuant to Federal Aviation Requirements 25.853 which is characterized as:
    being self-extinguishing when tested vertically in accordance with Federal Aviation Requirement 25.853, Appendix F, Part I (b)(4) or other equivalent means;
    having an average burn length not exceeding 8 inches when tested vertically in accordance with Federal Aviation Requirement 25.853, Appendix F, Part I (b)(4) or other equivalent means;
    having an average flame time after removal of the flame source not exceeding 15 seconds when tested vertically in accordance with Federal Aviation Requirement 25.853, Appendix F, Part I (b)(4) or other equivalent means; and
    having drippings that do not continue to flame for more than 5 seconds after falling when tested vertically in accordance with Federal Aviation Requirement 25.853, Appendix F, Part I (b)(4) or other equivalent means.

2. The method of claim 1 where said high tenacity continuous polyester filament yarn has a 500 to 600 denier-90 to 100 filament polyester film substrate.

3. The method of claim 1 where said high tenacity continuous polyester filament yarn has phosphorous levels in the range of 3000 to 7000 ppm.

4. The method of claim 1, where said high tenacity continuous polyester filament yarn has phosphorous levels in the range of 1000 to 3000 ppm.

5. The method of claim 1, where said high tenacity continuous polyester filament yarn has a tenacity of at least 3 to 7 grams per denier.

6. The method of claim 1, where said high tenacity continuous polyester filament yarn is woven into said plain weave on a water jet loom where the filling yarn and the warp yarn are the same said high tenacity continuous polyester filament yarn.

7. The method of claim 1, where said heat setting is performed on a pin tenter that shrinks and sets said fabric to 45-53 ends and 45-53 picks.

* * * * *